(12) United States Patent
Pimentel et al.

(10) Patent No.: US 8,736,307 B2
(45) Date of Patent: May 27, 2014

(54) BIDIRECTIONAL TRANSCEIVER AND METHOD

(75) Inventors: Aurelio Pimentel, Shanghai (CN); James Lepkowski, Glendale, AZ (US); Frank Dover, Mesa, AZ (US); Senpeng Sheng, Chandler, AZ (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 13/360,927

(22) Filed: Jan. 30, 2012

(65) Prior Publication Data

US 2013/0195153 A1    Aug. 1, 2013

(51) Int. Cl.
*H03K 19/0185* (2006.01)

(52) U.S. Cl.
USPC ............ 326/83; 326/81; 326/86; 326/30; 326/56; 326/104; 375/257

(58) Field of Classification Search
USPC ............ 326/37–41, 47, 101, 56, 30, 81–83, 326/86–87, 104, 114–115; 375/220, 222, 375/288, 232, 346; 327/108–109, 333; 455/88, 76, 86, 127.4, 118, 180.3
See application file for complete search history.

(56) References Cited

U.S. PATENT DOCUMENTS

| | | | |
|---|---|---|---|
| 5,579,336 A | 11/1996 | Fitzgerald | |
| 5,592,509 A | 1/1997 | McClear | |
| 5,801,549 A * | 9/1998 | Cao et al. | 326/83 |
| 7,133,648 B1 | 11/2006 | Robinson | |
| 8,324,930 B1 * | 12/2012 | Jenkins, IV | 326/38 |
| 2007/0291830 A1 * | 12/2007 | Hori | 375/220 |
| 2008/0201623 A1 * | 8/2008 | Reggiori et al. | 714/719 |
| 2009/0289693 A1 * | 11/2009 | Motamed et al. | 327/437 |

* cited by examiner

*Primary Examiner* — Thienvu Tran
*Assistant Examiner* — Christopher Lo
(74) *Attorney, Agent, or Firm* — Rennie William Dover (57) ABSTRACT

In accordance with an embodiment, a transceiver includes a bidirectional data transmission circuit coupled to a direction control circuit and method for transmitting electrical signals in one or more directions. The direction control circuit generates a comparison signal in response to comparing input/output signals of the bidirectional data transmission circuit. Transmission path enable signals are generated in response to the comparison signal.

20 Claims, 10 Drawing Sheets

BIDIRECTIONAL TRANSCEIVER AND METHOD

BACKGROUND

The present invention relates, in general, to electronics and, more particularly, to methods of forming semiconductor devices and structure.

In the past, the electronics industry used transmitters and receivers for transmitting data to one or more devices and for receiving data from other devices. A device capable of transmitting and receiving data is a bidirectional transceiver. Bidirectional transceivers typically include one or more direction control pins to control whether the transceivers operate to transmit data or to receive data. Transceivers are disclosed in U.S. Pat. No. 5,592,509 issued to Mark T. McClear et al. on Jan. 7, 1997, U.S. Pat. No. 5,579,336 issued to John J. Fitzgerald on Nov. 26, 1996, and U.S. Pat. No. 7,133,648 B1 issued to Moises E. Robinson et al. on Nov. 7, 2006.

Accordingly, it would be advantageous to have a bidirectional transceiver and a method for transmitting and receiving data. In addition, it is desirable for the method and circuit to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current flow through the device such as a gate of an MOS transistor or a base of a bipolar transistor. Although the devices are explained herein as certain N-channel or P-channel devices, or certain N-type or P-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten per cent (10%) (and up to twenty per cent (20%) for semiconductor doping concentrations) are regarded as reasonable variances from the ideal goal of exactly as described.

It should be noted that a logic zero voltage level ($V_L$) is also referred to as a logic low voltage and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Transistor-Transistor Logic (TTL) system a logic zero voltage level may be about 0.8 volts, whereas for a five volt CMOS system, the logic zero voltage level may be about 1.5 volts. A logic one voltage level ($V_H$) is also referred to as a logic high voltage level and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

Figure 1:
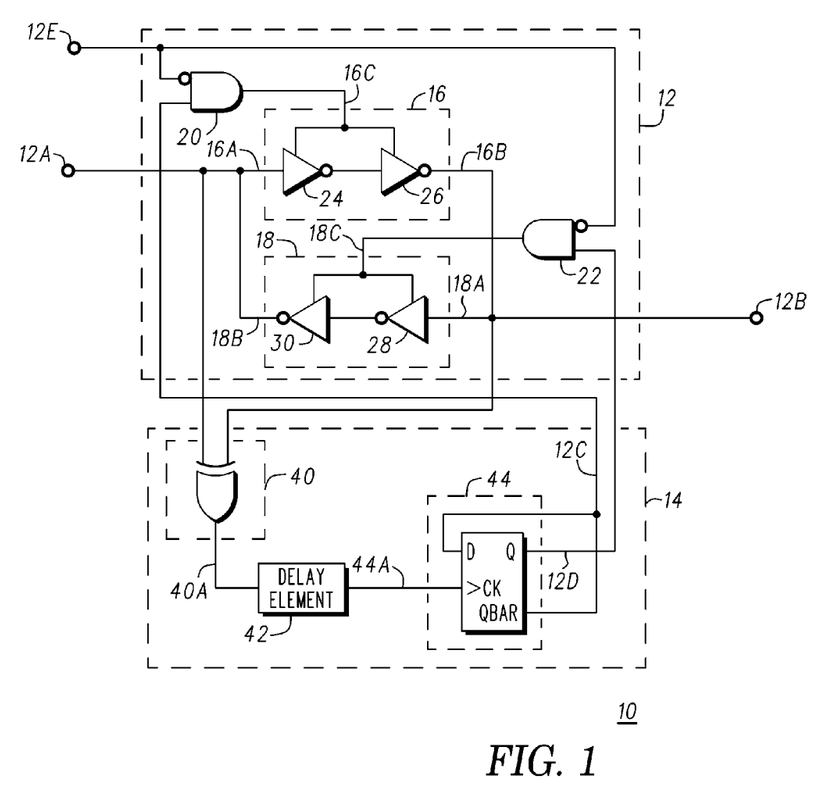
FIG. 1 is a circuit schematic of a bidirectional transceiver in accordance with an embodiment of the present invention.

FIG. 1 is a circuit schematic of a monolithically integrated autosensing, autodirection changing bidirectional transceiver 10 in accordance with an embodiment of the present invention. Bidirectional transceiver 10 is comprised of a bidirectional data transmission circuit 12 connected to a direction control circuit 14. More particularly, bidirectional data transmission circuit 12 has input/output terminals 12A and 12B, input terminals 12C and 12D, and an enable terminal 12E and is comprised of driver sections or stages 16 and 18 and direction control elements 20 and 22. Driver section 16 has an input terminal 16A and an output terminal 16B and driver section 18 has an input terminal 18A and an output terminal 18B, where driver sections 16 and 18 form portions of signal transmission paths. By way of example, driver section 16 may be comprised of a circuit element 24 connected to a circuit element 26, where an input terminal of circuit element 24 serves as input terminal 16A, an output terminal of circuit element 26 serves as output terminal 16B, and the output terminal of circuit element 24 is connected to the input terminal of circuit element 26. Driver section 18 may be comprised of a circuit element 28 connected to a circuit element 30, where an input terminal of circuit element 28 serves as input terminal 18A, an output terminal of circuit element 30 serves as output terminal 18B, and the output terminal of circuit element 28 is connected to the input terminal of circuit element 30. By way of example, circuit elements 24, 26, 28, and 30 are inverters. Input terminal 16A is connected to output terminal 18B to form input/output terminal 12A and input terminal 18A is connected to output terminal 16B to form input/output terminal 12B. Although each driver section 16 and 18 has been described as comprising a pair of serially connected inverters, this is not a limitation of the present invention. Alternatively, each driver section may be comprised of a single noninverter driver, a single inverter driver, or a plurality of inverter drivers connected in series. In addition, each driver section 16 and 18 may be comprised of logic gates, wherein in a series configured embodiment, the logic gates of circuit elements 26 and 30 have tri-state outputs and the output gates of circuit elements 24 and 28 optionally have tri-state outputs.

Figure 2:
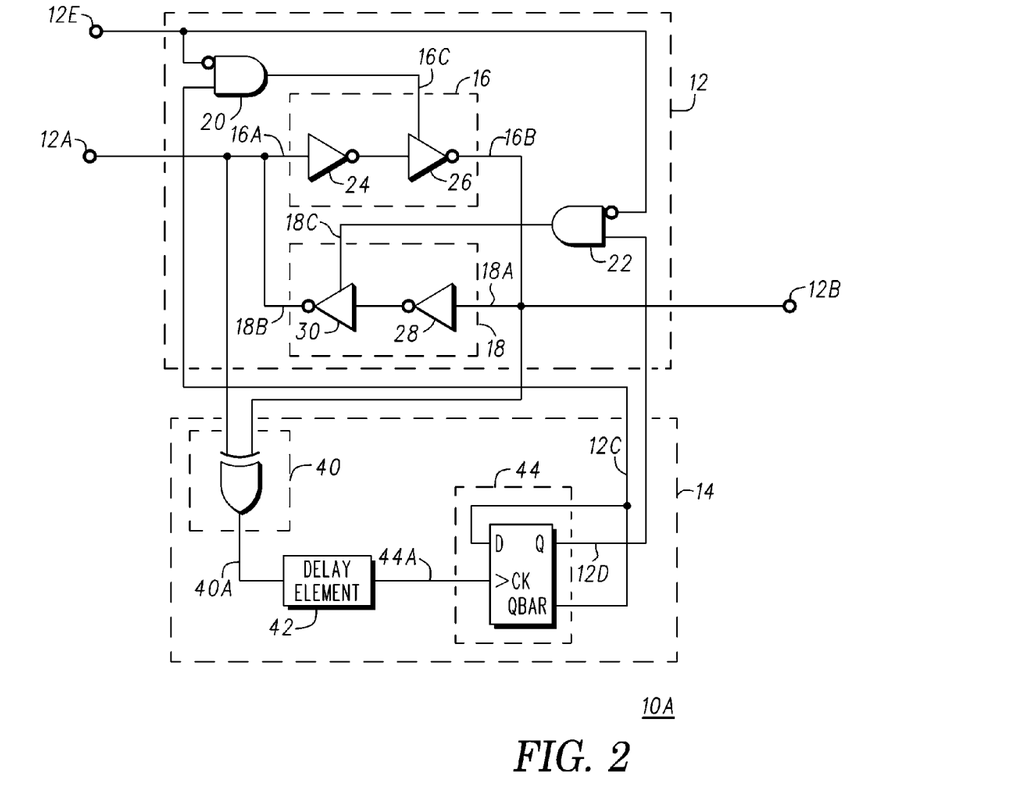
FIG. 2 is a circuit schematic of a bidirectional transceiver in accordance with another embodiment of the present invention.

Direction change control element 20 may be, for example, an AND gate having an input terminal, an active low input terminal, and an output terminal, and direction change control element 22 may be, for example, an AND gate having an input terminal, an active low input terminal, and an output terminal. The active low input terminals of AND gates 20 and 22 are commonly connected together to form input terminal 12E, the active high input terminal of AND gate 20 serves as input terminal 12C, and the active high input terminal of AND gate 22 serves as input terminal 12D. The output terminal of AND gate 20 is connected to an enable terminal 16C of driver section 16 and the output terminal of AND gate 22 is connected to an enable terminal 18C of driver section 18. Enable terminal 16C is connected to control terminals of inverters 24 and 26 and enable terminal 18C is connected to control terminals of inverters 28 and 30. Although enable terminal 16C is shown as controlling the enable terminals of inverters 24 and 26 and enable terminal 18C is shown as controlling the enable terminals of inverters 28 and 30, these are not limitations of the present invention. For example, enable terminal 16C may be configured to control inverter 26 and enable terminal 18C may be configured to control inverter 30, rather than inverters 24 and 26 and inverter 28 and 30, respectively. FIG. 2 is a circuit schematic illustrating a circuit configuration 10B in which enable terminal 16C may be configured to control inverter 26 and enable terminal 18C may be configured to control inverter 30 and enable inputs of inverters 24 and 28 are either not connected, i.e., left floating, or they may be absent.

Figure 3:
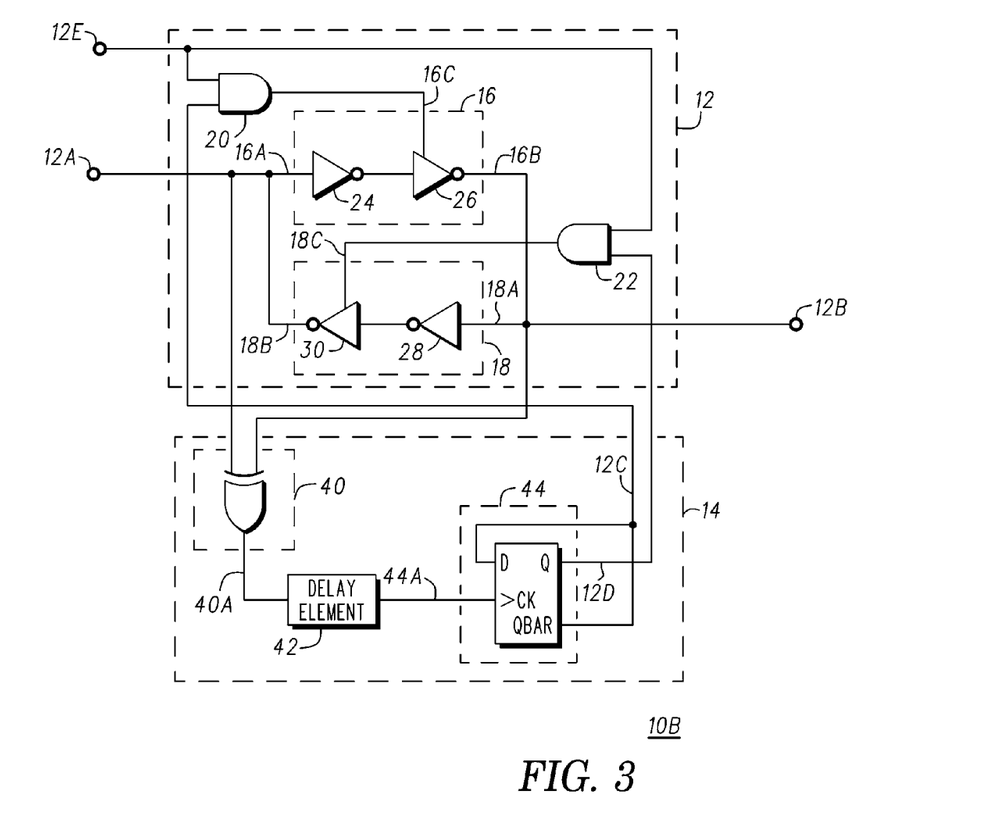
FIG. 3 is a circuit schematic of a bidirectional transceiver in accordance with another embodiment of the present invention.

In addition, enable terminal 12E may be configured to be an active high input terminal such that transceiver 10 may be enabled in response to a logic high signal appearing at input terminal 12E. FIG. 3 is a circuit schematic illustrating a circuit configuration 10C in which enable terminal 12E may be configured to be an active high input terminal.

It should be noted that direction change control elements 20 and 22 are not limited to being AND gates but may be implemented using other logic gates or combinations of logic gates configured to enable and disable driver sections 16 and 18.

Figure 4:
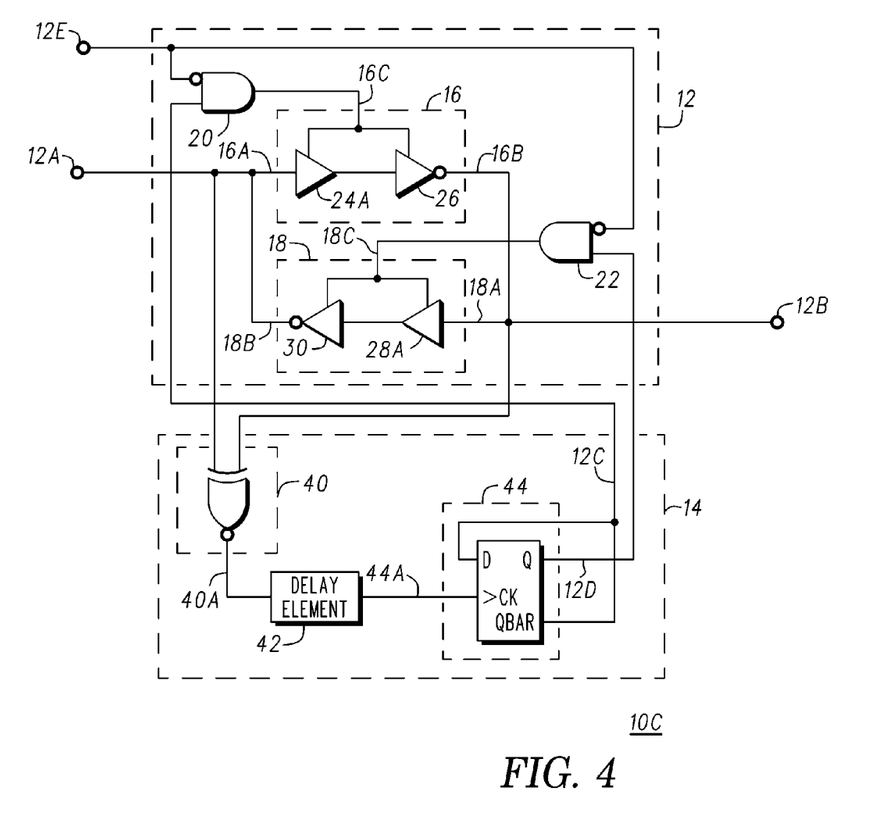
FIG. 4 is a circuit schematic of an inverting bidirectional transceiver in accordance with another embodiment of the present invention.
Figure 5:
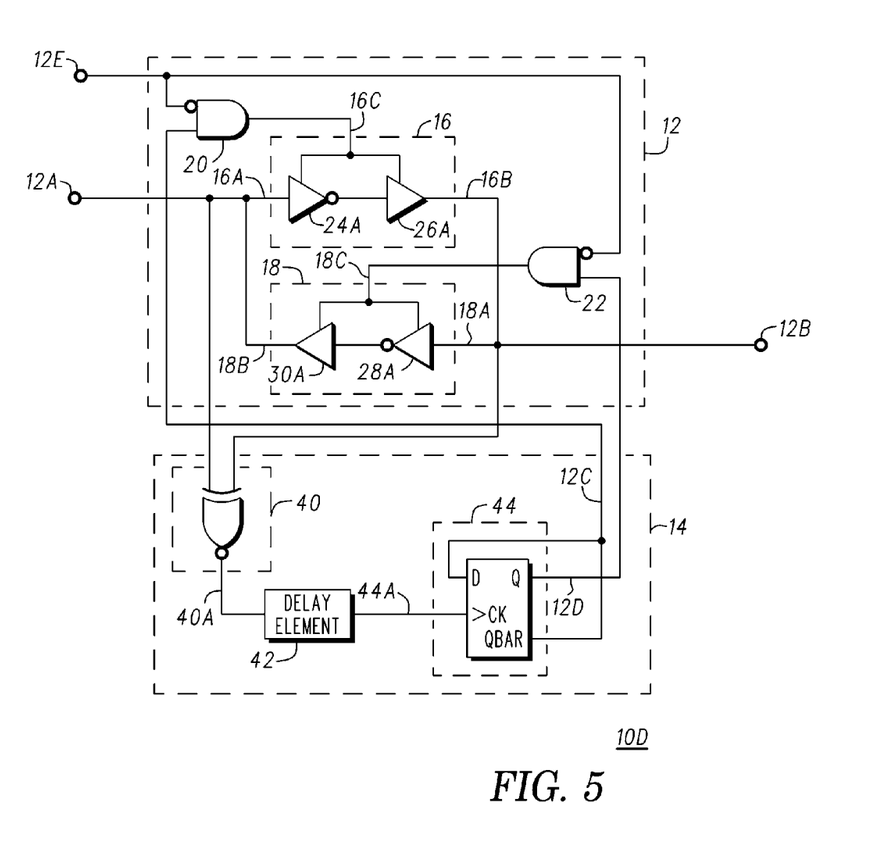
FIG. 5 is a circuit schematic of an inverting bidirectional transceiver in accordance with another embodiment of the present invention.
Figure 6:
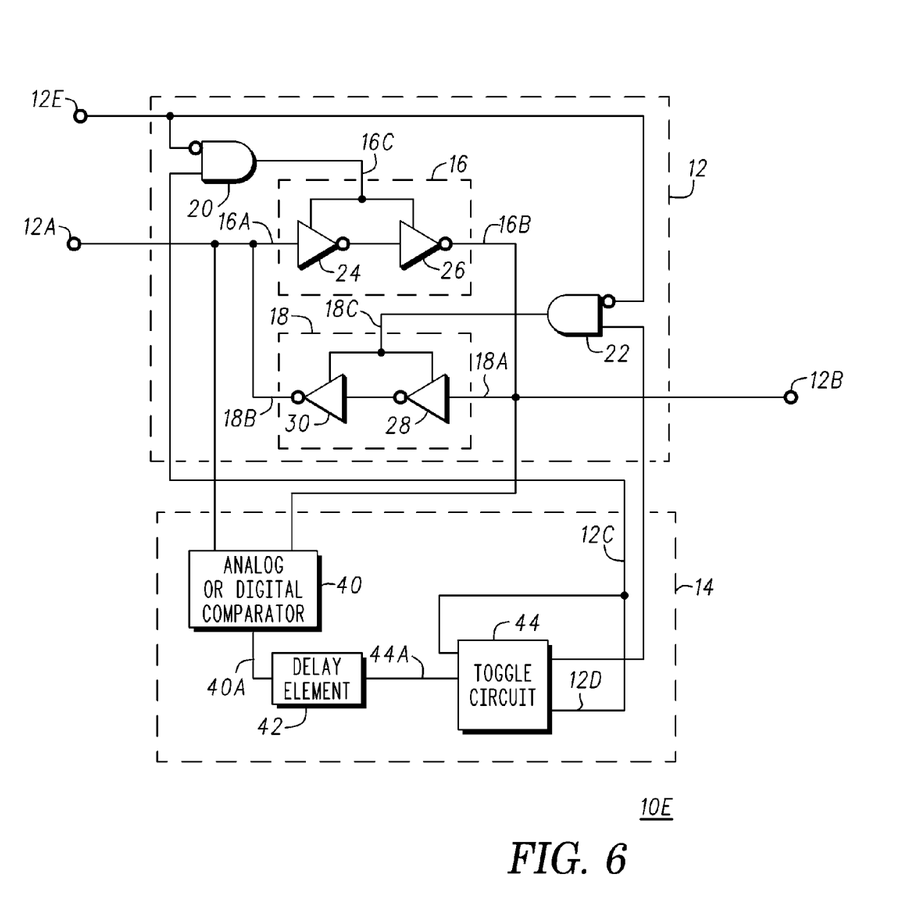
FIG. 6 is a circuit schematic of a bidirectional transceiver in accordance with another embodiment of the present invention.

In accordance with an embodiment, direction control circuit 14 is comprised of a comparator 40 connected to a direction flag 44. By way of example, comparator 40 is an exclusive OR gate and direction flag 44 is a bistable device such as, for example, a flip-flop. Exclusive OR gate 40 has an input terminal connected to input/output terminal 12A, an input terminal connected to input/output terminal 12B, and an output terminal 40A and flip-flop 44 has a data input terminal (D), a clocking input terminal 44A (CK), a data output terminal (Q), and an inverted data output terminal (QBAR). The data output terminal of flip-flop 44 serves as or, alternatively, is connected to input terminal 12D, the inverted data output terminal (QBAR) and the data input terminal (D) of flip-flop 44 are commonly connected together to form input terminal 12C. Output terminal 40A of exclusive OR gate 40 may be coupled to the clocking input terminal 44A of flip-flop 44. It should be noted that output terminal 40A may be directly connected to input terminal 44A or it may be coupled to input terminal 44A through a circuit element such as, for example, delay element 42, which may have an input terminal connected to output terminal 40A of exclusive OR gate 40 and an output terminal connected to clocking input terminal 44A of flip-flop 44. It should be noted that comparator 40 is not limited to being an exclusive OR gate and direction flag 44 is not limited to being a flip-flop. Other suitable implementations for comparator 40 include an analog comparator, a digital comparator, an exclusive NOR gate, combinations of logic gates, or the like and other suitable implementations of direction flag 44 include circuit configurations in which the circuit output toggles between logic high and logic low voltages in response to a pulse at clocking input terminal 44A. FIG. 4 is a circuit schematic of a circuit configuration 10C of a bidirectional transceiver in accordance with an embodiment in which comparator 40 comprises an exclusive NOR gate and the circuit elements of driver section 16 are comprised of a driver 24A and an inverter 26, where an input terminal of driver 24A serves as input terminal 16A, an output terminal of inverter 26 serves as output terminal 16B, and the output terminal of driver 24A is connected to the input terminal of inverter 26. The circuit elements driver section 18 are comprised of a driver 28A and an inverter 30, where an input terminal of driver 28A serves as input terminal 18A, an output terminal of inverter 30 serves as output terminal 18B, and the output terminal of driver 28A is connected to the input terminal of inverter 30. FIG. 5 is a circuit schematic of a circuit configuration 10D of a bidirectional transceiver in accordance with an embodiment in which comparator 40 comprises an exclusive NOR gate and the circuit elements of driver section 18 are comprised of an inverter 24 and a driver 26A, where an input terminal of inverter 24 serves as input terminal 16A, an output terminal of driver 26A serves as output terminal 16B, and the output terminal of inverter 24 is connected to the input terminal of driver 26A. The circuit elements of driver section 18 are comprised of an inverter 28 and a driver 30A, where an input terminal of inverter 28 serves as input terminal 18A, an output terminal of driver 30A serves as output terminal 18B, and the output terminal of inverter 28 is connected to the input terminal of driver 30A. FIG. 6 is a circuit schematic of a circuit configuration 10E illustrating comparator 40, which can be an analog or a digital comparator and direction flag 44 as a toggle circuit in which the circuit output toggles between logic high and logic low voltages in response to a pulse at clocking input terminal 44A.

Figure 7:
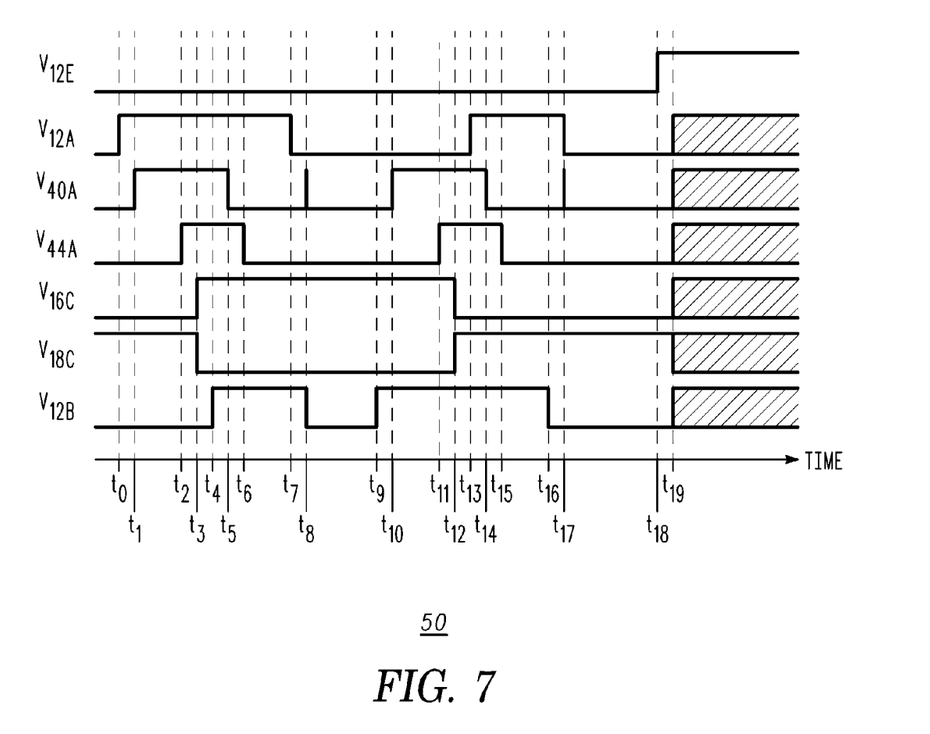
FIG. 7 is a timing diagram for the bidirectional transceiver of FIG. 1 in accordance with an embodiment of the present invention.

The operation of bidirectional transceiver 10 is described with reference to FIGS. 1 and 7, where FIG. 7 is a timing diagram 50 illustrating the operation of, for example, bidirectional transceiver 10 in accordance with an embodiment of the present invention. Before time $t_0$, converter 10 is configured to transmit data from input/output terminal 12B to input/output terminal 12A, logic low voltages appear at input/output terminals 12A and 12B, input terminals 12C and 12E, enable input terminal 16C, output terminal 40A of exclusive OR gate 40, and input terminal 44A of flip-flop 44 and a logic high voltage appears at input terminal 12D and enable input terminal 18C. At time $t_0$, the voltage $V_{12A}$ at input/output terminal 12A transitions from a logic low voltage to a logic high voltage. Although the voltages at the input terminals of exclusive OR gate 40 are different at time $t_0$, i.e., the voltage at one input terminal is a logic high voltage and the voltage at the other input terminal is a logic low voltage, the voltage $V_{40A}$ at output terminal 40A of exclusive OR gate 40 remains at a logic low voltage level. In accordance with an embodiment, voltage 40A serves as a comparison signal. After a propagation delay through exclusive OR gate 40, voltage $V_{40A}$ at output terminal 40A of exclusive OR gate 40 transitions to a logic high voltage level at time $t_1$. After a delay introduced by delay element 42, a logic high voltage appears at input terminal 44A of flip-flop 44 at time $t_2$, i.e., voltage $V_{44A}$, transitions to a logic high voltage level. In accordance with an embodiment, delay time ($\Delta t$) of delay element 42 is selected to be greater than the total propagation delay of a signal through exclusive OR gate 40 and through driver section 16 or driver section 18. The delay time $\Delta t$ is the difference in time between times $t_2$ and $t_1$ and represents the amount it takes for a signal to propagate through delay element 42. An output pulse from the exclusive OR gate 40 with width less than the delay time $\Delta t$ will not be propagated through the delay element 42. An output pulse from the exclusive OR gate 40 with width greater than the delay time $\Delta t$ indicates a change in the direction of data transmission. Thus, delay time $\Delta t$ may be referred to as a direction change validation period.

In response to the logic low voltage to logic high voltage transition appearing at input terminal 44A, flip-flop 44 generates a logic high voltage at output terminal 12C and a logic low voltage at output terminal 12D, which causes AND gate 20 to generate a logic high voltage at output terminal 16C and AND gate 22 to generate a logic low voltage at output terminal 18C, respectively, at time $t_3$. The voltages at output terminals 16C and 18C are identified by reference characters $V_{16C}$ and $V_{18C}$, respectively. Voltage $V_{16C}$ transitioning to a logic high voltage level and voltage $V_{18C}$ transitioning to a logic low voltage level validate the occurrence of a change in the direction of data transmission. Thus, voltage $V_{16C}$ transitioning to a logic high voltage level serves as an enable signal that activates a signal transmission path. After the change in the data direction, the data at input/output terminal 12B tracks that of input/output terminal 12A until the next direction change.

At time $t_4$, the voltage $V_{12B}$ at input/output terminal 12B transitions to a logic high voltage level. The voltages at both input terminals of exclusive OR gate 40 are at logic high voltage levels. Thus, after the propagation delay through exclusive OR gate 40, the voltage at output terminal 40 transitions to a logic low voltage level at time $t_5$. After a delay $\Delta t$ introduced by delay element 42, the signal at input terminal 44A transitions to a logic low voltage at time $t_6$. In accordance with an embodiment, the delay time ($\Delta t$) of delay element 42 is selected to be greater than the total propagation time of a signal through exclusive OR gate 40 and through driver section 16 or driver section 18.

At time $t_7$, voltage $V_{12A}$ at input/output terminal 12A transitions to a logic low voltage level. The voltage level at one input terminal of exclusive OR gate 40 is a logic high voltage and the voltage level at the other input terminal of exclusive OR gate 40 is a logic low voltage. Thus, after the propagation delay of exclusive OR gate 40, the voltage $V_{40A}$ at output terminal 40A transitions to a logic high voltage level at time $t_8$. At about time $t_8$, the voltage $V_{12B}$ at input/output terminal 12B transitions to a logic low voltage level being driven to a logic low voltage level by $V_{12A}$. Thus, the voltage signals at the input terminals of exclusive OR gate 40 are at logic low voltage levels. The voltage $V_{40A}$ at output terminal 40A transitions back down to logic low voltage level. Because the total propagation delay through exclusive OR gate 40 and through driver section 16 or driver section 18 is less than the delay time of delay element 42, the amount of time voltage $V_{40A}$ at output terminal 40A is at a logic high voltage level is insufficient to cause output voltage $V_{44A}$ at terminal 44A of delay element 42 to transition to a logic high voltage. Thus, the voltages at output terminals 12C and 12D remain at logic high and logic low voltage levels, respectively, and voltages $V_{16C}$ and $V_{28C}$ at output terminals 16C and 18C remain at logic high and logic low voltage levels, respectively.

At time $t_9$, voltage $V_{12B}$ at input/output terminal 12B transitions from a logic low voltage level to a logic high voltage level. Although the voltages at the input terminals of exclusive OR gate 40 are different at time $t_9$, i.e., the voltage at one input terminal is at a logic high voltage level and the voltage at the other input terminal is at a logic low voltage level, the voltage $V_{40A}$ at output terminal 40A of exclusive OR gate 40 remains at a logic low voltage level. After the propagation delay through exclusive OR gate 40 and the voltage $V_{40A}$ at output terminal 40A of exclusive OR gate 40 transitions to a logic high voltage level at time $t_{10}$. After a delay introduced by delay element 42, a logic high voltage appears at input terminal 44A of flip-flop 44 at time $t_{11}$, i.e., voltage $V_{44A}$ transitions to a logic high voltage level.

In response to the logic low voltage to logic high voltage transition appearing at input terminal 44A, flip-flop 44 generates a logic low voltage at output terminal 12C and a logic high voltage at output terminal 12D, which cause AND gate 20 to generate a logic low voltage at output terminal 16C and AND gate 22 to generate a logic high voltage at output terminal 18C, respectively, at time $t_{12}$. Thus, voltage $V_{16C}$ transitions to a logic low voltage level and voltage $V_{28C}$ transitions to a logic high voltage level. Voltage $V_{18C}$ serves as an enable signal that activates a signal transmission path.

At time $t_{13}$, the voltage $V_{12A}$ at input/output terminal 12A transitions to a logic high voltage level. The voltages at both input terminals of exclusive OR gate 40 are at a logic high voltage level. Thus, after the propagation delay of exclusive OR gate 40, the voltage at output terminal 40A transitions to a logic low voltage level at time $t_{14}$. After delay $\Delta t$ introduced by delay element 42, the voltage at input terminal 44A transitions to a logic low voltage at time $t_{15}$. As discussed above the delay time ($\Delta t$) of delay element 42 is selected to be greater than the total propagation time of a signal through exclusive OR gate 40 and through driver section 16 or driver section 18.

At time $t_{16}$, voltage $V_{12B}$ at input/output terminal 12B transitions to a logic low voltage level. The voltage at one input terminal of exclusive OR gate 40 is at a logic high voltage level and the voltage at the other input terminal of exclusive OR gate 40 is at a logic low voltage level. Thus, after a propagation delay through exclusive OR gate 40, voltage $V_{40A}$ at output terminal 40A transitions to a logic high voltage level at time $t_{17}$. At about time $t_{17}$, voltage $V_{12A}$ at input/output terminal 12A transitions to a logic low voltage level. Thus, the voltage signals at the input terminals of exclusive OR gate 40 are at a logic low voltage level. The voltage $V_{40A}$ at output terminal 40A transitions back down to logic low voltage level. Because the total propagation delay through exclusive OR gate 40 and through driver section 16 or driver section 18 is less than the delay time of delay element 42, the amount of time voltage $V_{40A}$ at output terminal 40A is at a logic high voltage level is insufficient to cause output voltage $V_{44A}$ at terminal 44A of delay element 42 to transition to a logic high voltage. Thus, the voltages at output terminals 12C and 12D remain at logic low and logic high voltage levels, respectively, and voltages $V_{16C}$ and $V_{18C}$ at output terminals 16C and 18C remain at logic low and logic high voltage levels, respectively.

At time $t_{18}$, enable signal $V_{12E}$ at input terminal 12E transitions to a logic high voltage level. In response to the voltage $V_{12E}$ being at a logic high level, bidirectional transceiver 10 enters a high impedance state at time $t_{19}$.

Figure 8:
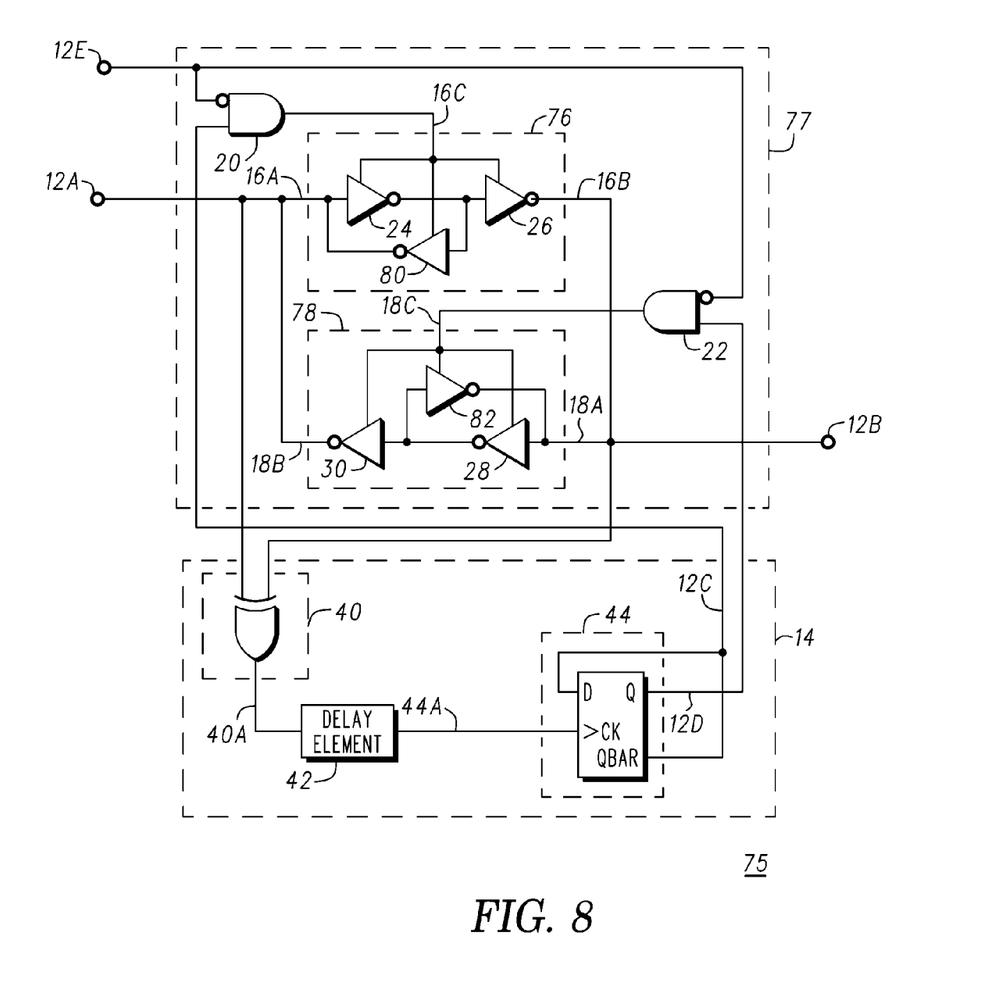
FIG. 8 is circuit schematic of a bidirectional transceiver in accordance with another embodiment of the present invention.

FIG. 8 is a circuit schematic of a monolithically integrated autosensing, autodirection changing bidirectional transceiver 75 in accordance with another embodiment of the present invention. Bidirectional transceiver 75 is comprised of a bidirectional data transmission circuit 77 connected to a direction control circuit 14. More particularly, bidirectional data transmission circuit 77 has input/output terminals 12A and 12B, input terminals 12C and 12D, an enable terminal 12E, and is comprised of driver sections 76 and 78 and direction change control elements 20 and 22. Driver section 76 is similar to driver section 16 and has an input terminal 16A and an output terminal 16B and driver section 78 is similar to driver section 18 and has an input terminal 18A and an output terminal 18B. By way of example, driver section 76 may be comprised of a circuit element 24 connected to a circuit element 26, where an input terminal of circuit element 24 serves as input terminal 16A, an output terminal of circuit element 26 serves as output terminal 16B, and the output terminal of circuit element 24 is connected to the input terminal of circuit element 26. Driver section 78 may be comprised of a circuit element 28 connected to a circuit element 30, where an input terminal of circuit element 28 serves as input terminal 18A, an output terminal of circuit element 30 serves as output terminal 18B, and the output terminal of circuit element 28 is connected to the input terminal of circuit element 30. By way of example, circuit elements 26 and 28 are inverters. In addition, driver section 76 includes an inverter 80 having an input terminal connected to the commonly connected output terminal of inverter 24 and the input terminal of inverter 26, and an output terminal connected to the input terminal of inverter 24. Inverters 24 and 80 cooperate to form a bus hold circuit. Driver section 78 includes an inverter 82 having an input terminal connected to the commonly connected output terminal of inverter 28 and the input terminal of inverter 30, and an output terminal connected to the input terminal of inverter 28. Inverters 28 and 82 cooperate to form a bus hold circuit. Input terminal 16A is connected to output terminal 18B to form input/output terminal 12A and input terminal 18A is connected to output terminal 16B to form input/output terminal 12B. Although each driver section 76 and 78 has been described as comprising a pair of serially connected inverters, this is not a limitation of the present invention. Alternatively, each driver section may be comprised of a single noninverter driver, a single inverter driver, or a plurality of inverter drivers connected in series. In addition, each driver section 76 and 78 may be comprised of logic gates, wherein in a series configured embodiment, the logic gates of circuit elements 26 and 30 have tri-state outputs and the output gates of circuit elements 24 and 28 optionally have tri-state outputs.

Figure 9:
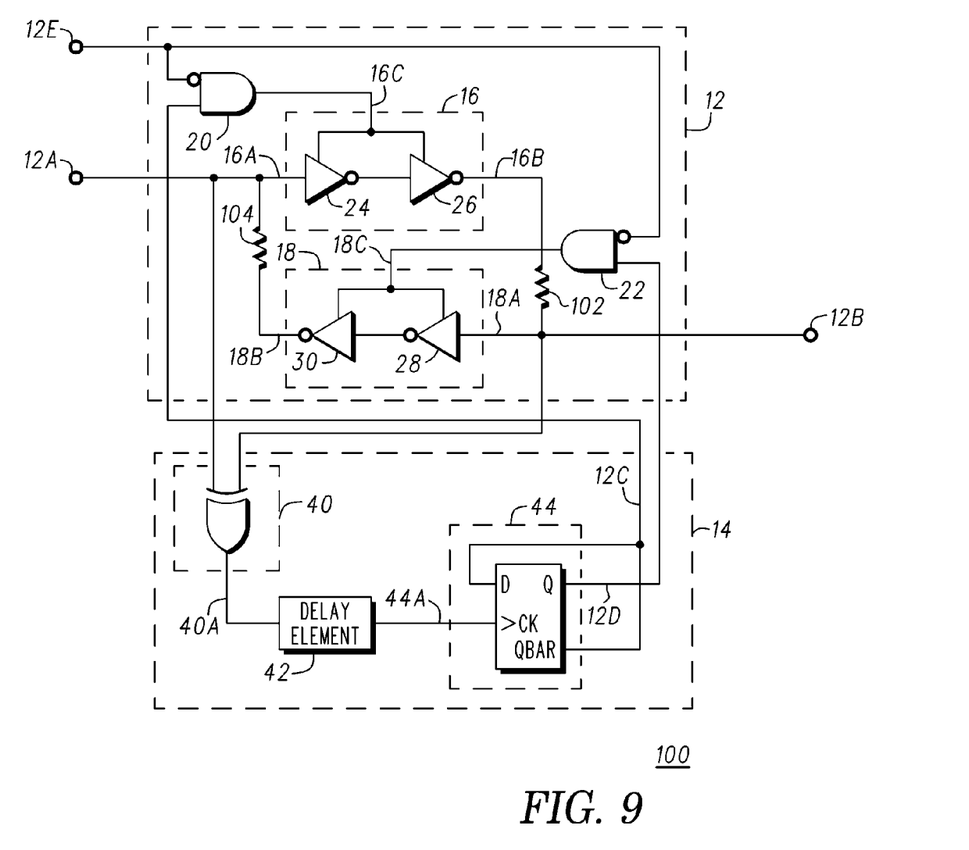
FIG. 9 is circuit schematic of a bidirectional transceiver in accordance with another embodiment of the present invention.

FIG. 9 is a circuit schematic of a monolithically integrated bidirectional transceiver 100 in accordance with another embodiment of the present invention. It should be noted that bidirectional transceiver 100 may be similar to bidirectional transceiver 10 except that bidirectional transceiver 100 includes drive resistors 102 and 104. More particularly, output terminal 16B of driver section 16 is connected to input/output terminal 12B through drive resistor 102 and output terminal 18B of driver section 18 is connected to input/output terminal 12A through drive resistor 104. It should be noted that drive resistors 102 and 104 may be discrete resistors or they may be monolithically integrated resistors. The operation of bidirectional transceiver 100 is similar to that of bidirectional transceiver 10.

Figure 10:
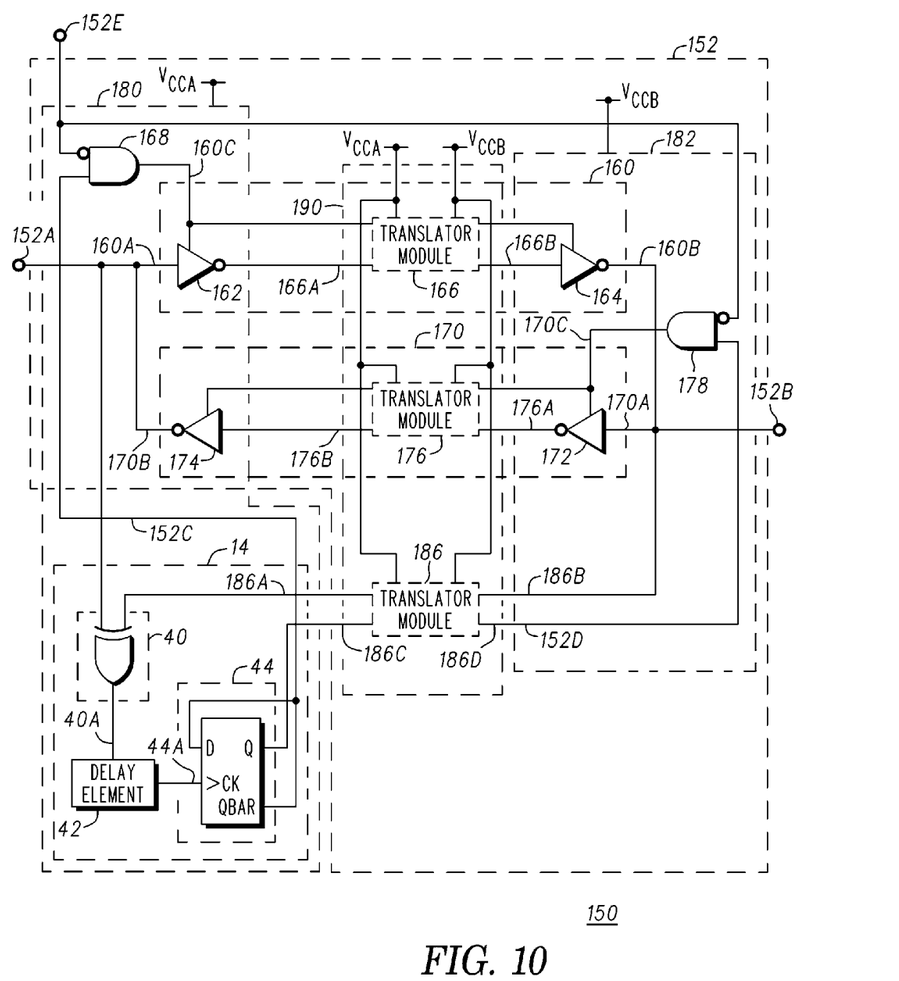
FIG. 10 is circuit schematic of a bidirectional transceiver in accordance with another embodiment of the present invention.

FIG. 10 is a circuit schematic of a monolithically integrated bidirectional transceiver 150 in accordance with another embodiment of the present invention. What is shown in FIG. 10 is a bidirectional data transmission circuit 152 connected to direction control circuit 14. More particularly, bidirectional data transmission circuit 152 has input/output terminals 152A and 152B, input terminals 152C and 152D, and enable terminal 152E and is comprised of driver sections 160 and 170 and direction change control elements 168 and 178. Driver section 160 has an input terminal 160A and an output terminal 160B and driver section 170 has an input terminal 170A and an output terminal 170B. By way of example, driver section 160 may be comprised of an inverter 162 connected to an inverter 164 through a translator module 166, where an input terminal of inverter 162 serves as or is connected to input terminal 160A, an output terminal of inverter 164 serves as or is connected to output terminal 160B, and the output terminal of inverter 162 is connected to an input terminal 166A of translator module 166 and an output terminal 166B of translator module 166 is connected to an input terminal of inverter 164. Driver section 170 may be comprised of an inverter 172 connected to an inverter 174 through a translator module 176, where an input terminal of inverter 172 serves as or is connected to input terminal 170A, an output terminal of inverter 174 serves as or is connected to output terminal 170B, and the output terminal of inverter 172 is connected to an input terminal 176A of translator module 166 and an output terminal 176B of translator module 166 is connected to an input terminal of inverter 174. Input terminal 160A is connected to output terminal 170B to form input/output terminal 152A and input terminal 170A is connected to output terminal 160B to form input/output terminal 152B.

By way of example, direction change control element 168 is an AND gate having an input terminal, an active low input terminal, and an output terminal, and direction change control element 178 is an AND gate having an input terminal, an active low input terminal, and an output terminal. The active low input terminals of AND gates 168 and 178 are commonly connected together to form input terminal 152E, the input terminal of AND gate 168 serves as or is connected to input terminal 152C, the input terminal of AND gate 178 serves as or is connected to input terminal 152D. The output terminal of AND gate 168 serves as or is connected to an enable terminal 160C of driver section 160 and the output terminal of AND gate 178 serves as or is connected to an enable terminal 170C of driver section 170. Enable terminal 160C is connected to a control terminal of inverter 162 and to a control terminal of inverter 164 through translator module 166 and enable terminal 170C is connected to a control terminal of inverter 172 and to a control terminal of inverter 174 through translator module 176. Although enable terminal 160C is shown as controlling the enable terminals of inverters 162 and 164 and enable terminal 170C is shown as controlling the enable terminals of inverters 172 and 174, these are not limitations of the present invention. For example, enable terminal 160C may be configured to control inverter 164 and enable terminal 170C may be configured to control inverter 174, rather than inverters 162 and 164 and inverters 172 and 174, respectively. In addition, enable terminal 152E may be configured to be an active high input terminal such that transceiver 150 may be enabled in response to a logic high signal appearing at input terminal 152E. It should be noted that direction change validation elements 168 and 178 are not limited to being AND gates but may be implemented using other logic gates or combinations of logic gates configured to enable and disable driver sections 160 and 170.

Direction control circuit 14 has been described with reference to FIG. 1. An input of comparator 40 is connected to input/output terminal 152A and the other input terminal of comparator 40 is connected to a terminal 186A of a translator module 186 and an output terminal 186B is connected input/output terminal 152B. An output terminal of direction flag 44 is connected to an input terminal 186C of translator module 186 and an output terminal 186D of translator module 186 is connected to input terminal 152D. A portion 180 of bidirectional transceiver 152 is coupled for receiving a source of operating potential $V_{CCA}$ and a portion 182 is coupled for receiving a source of operating potential $V_{CCB}$. Portion 180 may include direction control circuit 14, inverters 162, and 174, and direction change control element 168, where these elements are coupled for receiving a source of operating potential $V_{CCA}$ and portion 182 may be comprised of inverters 164 and 172 and direction change control element 178, wherein these elements are coupled for receiving a source of operating potential $V_{CCB}$. Direction control circuit 14 may alternately be coupled to receive a source of operating potential $V_{CCB}$, instead of $V_{CCA}$. Translator modules 166, 176, and 186 may be separate translator modules that are independent of each other or they may be a portion of a translator device 190 and they may be coupled for receiving potentials from both sources of operating potential $V_{CCA}$ and $V_{CCB}$.

The operation of bidirectional transceiver 150 is similar to the operation of bidirectional transceiver 10 except that the voltages between input/output terminals 152A and 152B are translated by voltage translator 166.

By now it should be appreciated that a bidirectional transceiver and a method for bidirectionally transmitting data have been provided. Bidirectional transceivers in accordance with embodiments of the present invention are autosensing autodirection changing bidirectional transceivers. Because of their ability to automatically change the direction of the signal transmission, direction pins may be omitted from the bidirectional transceivers configured in accordance with embodiments of the present invention. This lowers the cost of manufacturing bidirectional transceivers, eliminates complicated software to control the transmit and receive directions, and allows each channel's direction to be independent of the direction of other channels in multi-channel transceivers. In addition, the bidirectional transceivers may use fewer pins further reducing the cost of the transceivers.

In addition, bidirectional transceivers in accordance with embodiments of the present invention is that they may include a stronger output drive.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. An autosensing bidirectional transceiver, comprising:
    a bidirectional data transmission circuit having first and second input/output terminals, first and second input terminals, and first and second transmission paths, wherein the first signal transmission path comprises a first driver stage having an input terminal, an output terminal, and an enable terminal;
    a comparator having first and second input terminals and an output terminal, the first input terminal of the comparator coupled to the first input/output terminal of the bidirectional data transmission circuit and the second input terminal of the comparator coupled to the second input/output terminal of the bidirectional data transmission circuit; and
    a direction flag having an input terminal and a first output terminal, the input terminal of the direction flag coupled to the output terminal of the comparator
    wherein the first driver stage comprises:
        a first inverter having an input terminal and an output terminal; and
        a second inverter having an input terminal, an output terminal, and an enable terminal, the input terminal of the second inverter coupled to the output of the first inverter.

2. The autosensing bidirectional transceiver of claim 1, wherein
    the first input terminal of the comparator is directly coupled to the first input/output terminal of the bidirectional data transmission circuit and the second input terminal of the comparator is directly coupled to the second input/output terminal of the bidirectional data transmission circuit.

3. The autosensing bidirectional transceiver of claim 2, further including a delay element coupled between the output terminal of the comparator and the input of the direction flag.

4. The autosensing bidirectional transceiver of claim 3, wherein the comparator is an exclusive OR logic gate.

5. The autosensing bidirectional transceiver of claim 3, wherein the comparator is one of an analog comparator or a digital comparator.

6. The autosensing bidirectional transceiver of claim 3, wherein the direction flag is a means for toggling between first and second logic states in response to a pulse at its input terminal.

7. The autosensing bidirectional transceiver of claim 3, wherein the direction flag is a flip-flop.

8. The autosensing bidirectional transceiver of claim 3, wherein a delay time of the delay element is longer than a total propagation delay of the comparator and the signal transmission path.

9. The autosensing bidirectional transceiver of claim 2, further including a first direction control element coupled to the first signal transmission path and a second direction control element coupled to the second signal transmission path.

10. The autosensing bidirectional transceiver of claim 2, wherein the first signal transmission path comprises a first driver stage having an input terminal, an output terminal, and an enable terminal.

11. The autosensing bidirectional transceiver of claim 1, further including a first AND gate having first and second input terminals and an output terminal, the first input terminal coupled to the first output terminal of the direction flag and the output terminal coupled to the enable terminals of the first and second inverters.

12. The autosensing bidirectional transceiver of claim 11, wherein the second signal transmission path comprises a second driver stage having an input terminal, an output terminal, and an enable terminal.

13. The autosensing bidirectional transceiver of claim 12, wherein the second driver stage comprises:
    a third inverter having an input terminal, an output terminal, and an enable terminal; and
    a fourth inverter having an input terminal, an output terminal, and an enable terminal, the input terminal of the fourth inverter coupled to the output of the third inverter.

14. The autosensing bidirectional transceiver of claim 13, wherein the direction flag has a second output terminal and further including a second AND gate having first and second input terminals and an output terminal, the first input terminal coupled to the second output terminal of the direction flag and the output terminal coupled to the enable terminals of the third and fourth inverters.

15. The autosensing bidirectional transceiver of claim 14, wherein the output terminal of the fourth inverter is coupled to the input terminal of the first inverter and the output terminal of the second inverter is coupled to the input terminal of the third inverter.

16. The autosensing bidirectional transceiver of claim 15, further including a first resistor coupled between the output terminal of the fourth inverter and the input terminal of the first inverter.

17. A method for transmitting electrical signals in a plurality of directions, comprising:

providing a bidirectional data transmission circuit having first and second input/output terminals, first and second input terminals, first and second signal transmission paths, a first signal transmission path between the first input/output terminal and the second input/output terminal configured to transmit an electrical signal from the first input/output terminal to the second input/output terminal through a first driver stage that includes an enable terminal and first and second inverters, wherein an input terminal of the second inverter is coupled to an output terminal of the first inverter, and a second signal transmission path between the second input/output terminal and the first input/output terminal configured to transmit another electrical signal between the second input/output terminal and the first input/output terminal;

generating a first comparison signal in response to comparing a first signal at the first input/output terminal with a second signal at the second input/output terminal;

generating a first enable signal in response to the first comparison signal being at a first logic voltage level; and activating the first signal transmission path in response to the first enable signal at the enable terminal of the first driver stage.

18. The method of claim 17, wherein generating the first enable signal comprises:

transmitting the first comparison signal through a delay element to an input terminal of a direction flag;

generating an output signal at an output terminal of the direction flag, the first output signal of the direction flag serving as the first input/output signal.

19. The method of claim 18, wherein a delay through the delay element is longer than a propagation delay in generating the first comparison signal.

20. The method of claim 18, further including:

generating a second comparison signal in response to comparing a third signal at the first input/output terminal with a fourth signal at the second input/output terminal;

generating a second enable signal in response to the second comparison signal being at a second logic voltage level; and activating the second signal transmission path in response to the second enable signal.

* * * * *